United States Patent [19]
Ruth et al.

[11] Patent Number: 5,713,543
[45] Date of Patent: Feb. 3, 1998

[54] GOLF BAG STABILIZING DEVICE

[76] Inventors: William C. Ruth, 104 Ebbetts Dr., Atco, N.J. 08004; Robert I. McCrindle, 8 W. Kings Hwy., Mt. Ephraim, N.J. 08059

[21] Appl. No.: 560,742

[22] Filed: Nov. 20, 1995

[51] Int. Cl.$^6$ .................................................. A63B 55/00
[52] U.S. Cl. .................................................. 248/96
[58] Field of Search .................. 248/525, 526, 248/528, 96, 97, 150, 370, 434, 188.8, 188.7, 910; 206/315.2, 315.7, 315.8

[56] References Cited

U.S. PATENT DOCUMENTS

| | | | |
|---|---|---|---|
| 1,606,113 | 11/1926 | Walcott | 206/315.7 |
| 1,715,101 | 5/1929 | Shanahan | 206/315.7 |
| 1,715,668 | 6/1929 | Mooney | 206/315.7 |
| 3,747,882 | 7/1973 | Leis | 248/96 |
| 3,838,838 | 10/1974 | Seaman | 248/188.7 |
| 4,074,881 | 2/1978 | Bickford | 248/188.7 |
| 4,915,332 | 4/1990 | Ouellette | 248/528 |
| 5,492,301 | 2/1996 | Hauser | 248/188.7 |

FOREIGN PATENT DOCUMENTS

169592  10/1921  United Kingdom ................ 206/315.7

*Primary Examiner*—Ramon O. Ramirez
*Assistant Examiner*—Gwendolyn W. Baxter
*Attorney, Agent, or Firm*—Synnestvedt & Lechner

[57] ABSTRACT

A portable stand is disclosed that vertically stabilizes an object upon a supporting surface. In one embodiment, the stand comprises a sleeve that has a vertical axis and defines an interior region that is adapted to receive the object. A plurality of supporting members are radially disposed about the sleeve, each member having a proximate and a distal end. Each member is pivotly mounted to the sleeve and biased in a retracted position. In the retracted position, the proximate end of each member radially and inwardly extends in the interior of the sleeve. The members remain in the retracted position when the stand is not on a supporting surface. The stand also comprises an actuator that has a contacting surface. The actuator is adapted to slide axially within the sleeve and is biased in a downward position by gravity. In the downward position, the contacting surface is positioned below each proximate end. The actuator remains in the downward position when the stand is not on the supporting surface. When the stand is placed upon the supporting surface, however, the actuator meets the supporting surface and the sleeve slides over the actuator such that the actuator contacts each proximate end causing each member to pivot toward a deployed position. In the deployed position, the proximate end contacts the contacting surface and the distal end contacts the supporting surface. A connection mechanism is used for connecting the actuator to the sleeve such that the actuator remains axially aligned with the sleeve.

22 Claims, 6 Drawing Sheets

GOLF BAG STABILIZING DEVICE

BACKGROUND OF THE INVENTION

The invention relates generally to a stand for vertically supporting an object, and more specifically to a stand that uses supporting members for stability and does not disturb the surface on which it rests. Stands are used whenever a need exists to impart vertical stability to an object such as a bag, apparatus, or structural support. For example, when golfing, many people prefer to have their bags vertical for easy access to the clubs. The present invention provides the means for maintaining the golf bag in such an orientation.

Stands are well known in the art. These supports are basically designed alike with legs that extend from the stand as it is placed upon the supporting surface. The manner in which the legs are extended and held in the deployed position, however, varies considerably in the prior art. Some stands have gear operated mechanisms to extend three or more legs as a probe touches the supporting surface, while others use linkage systems for the same function. In both cases, the mechanisms tend to be complex. These complex mechanisms are not only expensive to manufacture and maintain, but also lead to jams and breakage. Additionally, these mechanisms add significantly to the overall height and weight of the stand/object assembly which consequently raises its moment, and thereby increases an object's instability when vertical. These shortcomings typically render the prior art designs unsuitable for grassy or uneven surfaces. Thus, a need exists for a stand with a simple, jam resilient design that can support an object on a grassy or uneven supporting surface. The present invention fulfills such a need.

SUMMARY OF THE PRESENT INVENTION

The present invention is directed at a portable stand that vertically stabilizes an object upon a supporting surface. In one embodiment, the stand comprises a sleeve that has a vertical axis and defines an interior region that is adapted to receive the object. A plurality of supporting members are radially disposed about the sleeve, each member having a proximate and a distal end. Each member is pivotly mounted to the sleeve and biased in a retracted position. In the retracted position, the proximate end of each member radially and inwardly extends in the interior of the sleeve. The members remain in the retracted position when the stand is not on a supporting surface. The stand also comprises an actuator that has a contacting surface. The actuator is adapted to slide axially within the sleeve and is biased in a downward position by gravity. In the downward position, the contacting surface is positioned below each proximate end. The actuator remains in the downward position when the stand is not on the supporting surface. When the stand is placed upon the supporting surface, however, the actuator meets the supporting surface and the sleeve slides over the actuator such that the actuator contacts each proximate end causing each member to pivot toward a deployed position. In the deployed position, the proximate end contacts the contacting surface and the distal end contacts the supporting surface. A connection mechanism is used for connecting the actuator to the sleeve such that the actuator remains axially aligned with the sleeve.

The following objects, features and advantages are met by one or more embodiments of the present invention:

An object of the invention is to provide a stand that has independent, free flowing support members which are unencumbered with complex linkages or gear mechanisms, and which deploy to impart stability to the stand and retract to be unobtrusive during transportation.

Another object of the invention is to provide a stand that has a simple actuator both to extend the supporting members, and to provide a backstop to prevent the supporting members from pivoting back to the retracted position.

It is a feature of the invention that it has a low profile and thus does not add significant height to the stand/object assembly.

It is another feature of the invention that it may be integral to the supported object.

It is an advantage of the present invention that it imparts vertical stability to an object on grassy or uneven surfaces using simple, jam resistant supporting members.

These and other objects, features and advantages of the invention will be apparent to those skilled in the art upon consideration of the following description of the invention.

BRIEF DESCRIPTION OF THE DRAWINGS

The features of the present invention, which are believed to be novel, are set forth with particularity in the appended claims. The invention may best be understood by reference to the following description taken in conjunction with the accompanying drawings, wherein like reference numerals identify like elements, and wherein:

DETAILED DESCRIPTION OF THE PRESENT INVENTION

The present invention provides a portable stand for vertically stabilizing an object upon a supporting surface. The object in this case may be any bag, apparatus, or structural member requiring vertical stabilization on a reasonably horizontal supporting surface. A common application for such a stand is found in supporting a golf bag such that the user has easy access to the clubs. The stand also makes a fine support for a Christmas tree. Additionally, the device may be used to support apparatus such as an intravenous device or a spot light which may require frequent movement and adjustment. Other suitable applications include supporting structural members such as an umbrella or tent pole where the user prefers not to anchor the object in the ground, or when anchoring is impractical or impossible. For example, the stand may be used to support an umbrella at a sidewalk café where anchoring the umbrella in the sidewalk would be difficult, if not prohibited. Therefore, the present invention provides for a portable stand that imparts vertical stability to any object without disturbing the supporting surface below it.

Figure 1A:
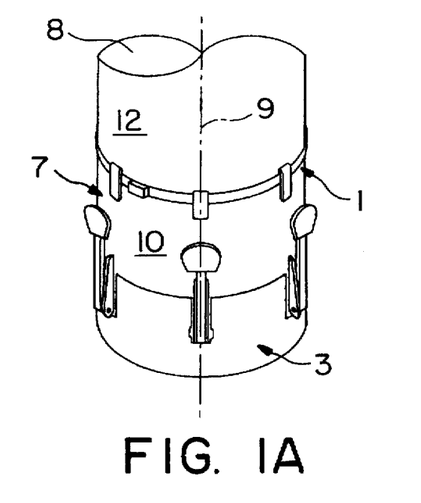
FIG. 1a shows a perspective view of the stand in the retracted position.
Figure 1B:
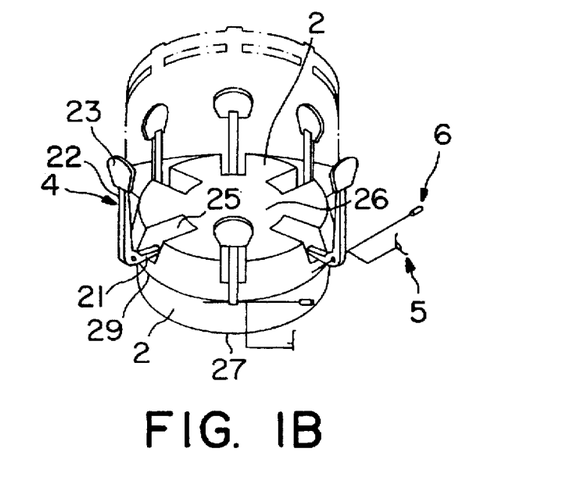
FIG. 1b shows the same view but with a phantom line representing the sleeve.
Figure 2:
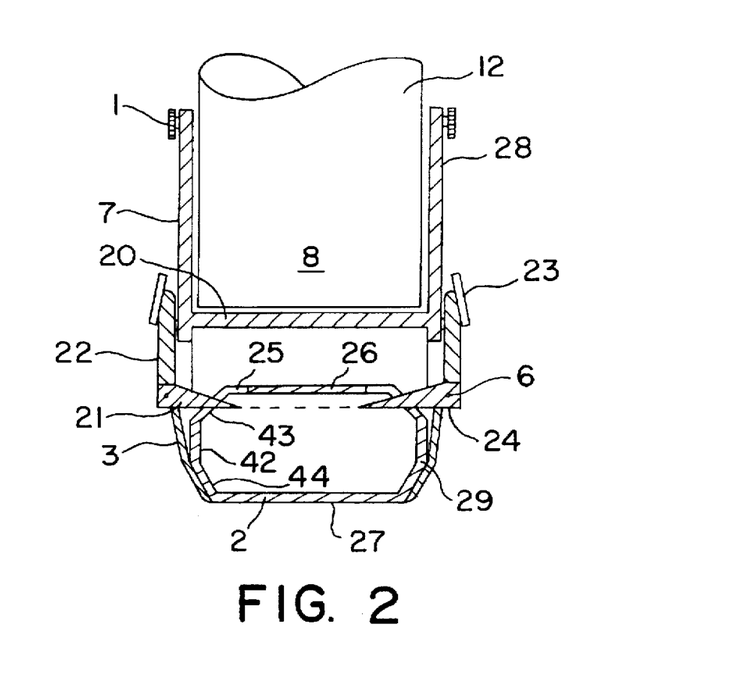
FIG. 2 shows a cross-sectional view of the stared in the retracted position.
Figure 3A:
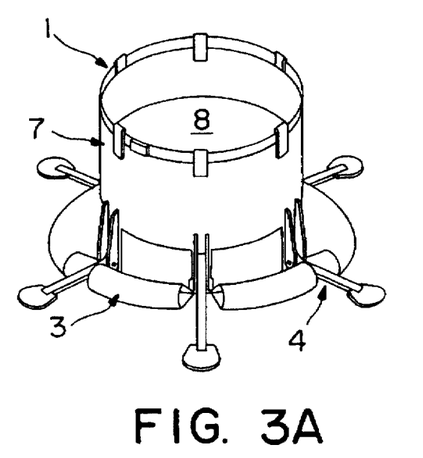
FIG. 3a shows a perspective view of the stand in the deployed position.
Figure 3B:
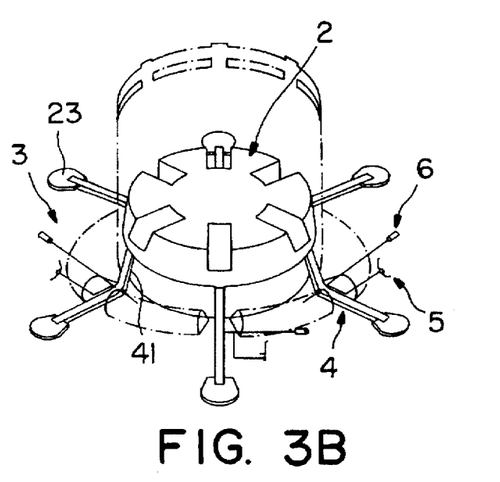
FIG. 3b shows the same view but with a phantom line representing the sleeve.
Figure 4:
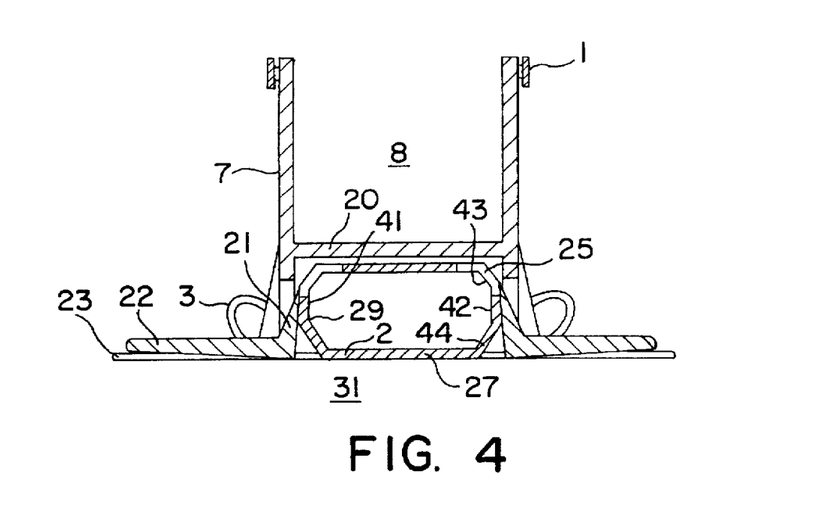
FIG. 4 shows a cross-sectional view of the stand in a deployed position.

As depicted in FIGS. 1 and 2, the stand basically includes four components—a sleeve 7, a plurality of supporting members 4, an actuator 2, and connecting means 3 for connecting the actuator 2 to the sleeve 7. The sleeve 7 generally has a vertical axis 9 and defines an interior region 8 adapted to receive the object 12. The plurality of supporting members 4 are radially disposed about the sleeve 7, and each member has a proximate and distal end 21, 22. Each member 4 is pivotly and axially mounted to the sleeve 7. Furthermore, the members 7 are biased toward a retracted position, as shown in FIGS. 1a and 1b, wherein each proximate end 21 radially and inwardly extends in the interior 8 of the sleeve 7. The members 4 remain in the retracted position when the stand is not on a supporting surface. The actuator 2 has a contacting surface 29 and is adapted to slide axially within the sleeve 7. The actuator 2 is biased in a downward position by gravity. In the downward position, the contacting surface 29 is positioned below each radially and inwardly extended proximate end 21. The actuator 2 remains in the downward position until the stand 10 is placed upon a supporting surface. When the stand is placed upon a supporting surface 31, the bottom 27 meets the supporting surface 31 and gravity slides the sleeve 7 over the actuator 2. As the sleeve slides over the actuator, the contacting surface 29 contacts each proximate end 21 causing each member 7 to pivot about pin 6 toward a deployed position as shown in FIGS. 3a, 3b, and 4. In the deployed position, a portion 23 of the distal end 22 contacts the supporting surface 31 and a portion 41 of the proximate end 21 contacts the contacting surface 29 such that the members 4 are prevented from pivoting back to the retracted position. Finally, connection means 3 connects the actuator 2 to the sleeve 7 such that the actuator 2 remains axially aligned with the sleeve 7.

Given these basic components, various embodiments are possible. FIGS. 1-4 depict a preferred embodiment. In this embodiment, the sleeve 7 has a circular horizontal cross section to receive a golf bag, although this shape may vary depending upon the object the stand 10 is intended to support. Moreover, the present invention provides for inserts that can be placed in the interior region 8 of the sleeve 7 to accommodate whatever shape the user desires. In the preferred embodiment, the sleeve 7 is rigid and contains a shelf 20 as shown in FIG. 2. The object 12 rests on the shelf 20, and receives lateral support from the upper portion 28 of the rigid sleeve 7. In another embodiment shown in FIG. 6, a shelf 63 has a well 67 for supporting the object, thereby lowering the height at which the object rests in the stand. The present embodiment also shows the upper portion 66 of the sleeve 61 extending inwardly to align approximately axially with the wall of well 67. As before, this upper portion 66 contacts the object to add lateral support. This design essentially positions the actuating mechanism and the support members outside the perimeter of the object rather than under the object. Therefore, it provides support but adds very little height to the stand/object assembly. The well not only lowers the object vis a vis the stand, but also provides a reservoir that may be used to hold fluids or soil. Such a feature would allow the stand to function as a planter/support for a large plant or tree.

Depending upon the height and inherent instability of the object supported, it may be advisable to further secure the object to the stand using attaching means such as a strap 1 as shown in FIG. 1. Strap 1 not only imparts greater stability to the object 12, but also secures the stand 10 to the object 12 enabling a user to move the assembly as one unit. This eliminates the need to place the stand on the supporting surface first, and then place the object in the stand. Simply picking-up and putting-down the unit as an assembly is convenient in many applications such as golfing when the bag must be moved frequently. To further stabilize the object, a pliable material, such as dense foam rubber, may be placed on the shelf 12 to accommodate the contours of the object to provide a more stable foundation.

Figure 5:
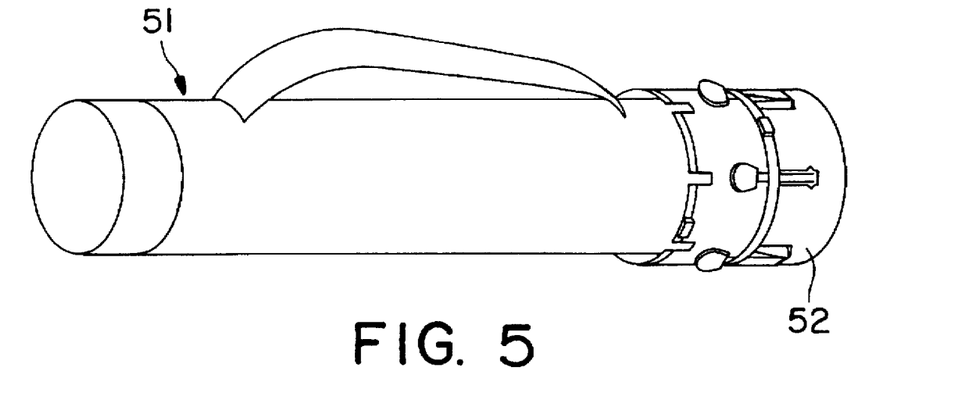
FIG. 5 shows the stand integral to a golf bag.

In yet another preferred embodiment of the invention, the stand 52 is integral with a golf bag 51 as shown in FIG. 5. It should be understood though, that the stand may be integral with many different objects, such as tent poles and umbrellas. It is anticipated that this configuration may be preferred in new object manufacture.

Both the number and shape of the members may be modified considerably without departing from the spirit of this invention. In the embodiment shown in FIGS. 1-4, six members 7 are used, but this number may be increased or decreased depending upon the requirements of supporting the object 12. The members may be unistructural or a rigid assembly of parts. FIGS. 1-4, show the members as essentially two rectilinear sections connected at an angle. Other suitable member configurations include bent tubing or a truss configuration for a high strength to weight ratio. Essentially, any design that imparts rigidity and pivotly mounts to the sleeve will suffice.

In the preferred embodiment, the supporting member 4 has an angle 24 such that the portion 23 of the proximate end 21 and the portion 41 of the distal end 22 are angled at least about ninety degrees to each other. The embodiment of FIG. 2 shows the angle to be about ninety degrees, and each member is mounted to the sleeve near the angle. Such a configuration enables the distal end 22 to draw close to the sleeve when in the retracted position. This reduces the obtrusiveness of the members when the stand is not in use, and thus reduces the likelihood that the members will snag or otherwise interfere during transportation. In some situations, it may be desirous to have an angle of greater than ninety degrees so that the members may be mounted above the bottom of the sleeve. This arrangement raises the point of lateral support which may be preferable for heavier loads. Indeed, any angle of at least about 90 degrees would be suitable for angle 24 as long as it is pivotly mounted along the sleeve 7 such that, when fully deployed, the distal end contacts the supporting surface and the proximate end contacts the contacting surface 29.

Preferably, the portion 23 of the distal end 22 that contacts the supporting surface is a pod of increased surface area as shown in FIGS. 1 through 4. Moreover, the pods may be specially suited for a particular supporting surface. In grassy environments, for example, the grass acts as a barrier to the more sturdy ground underneath. Rather than piercing through the grass to find terra firma, it is simpler to use the grass for support. To this end, a preferred embodiment of the pod has tufts of plastic that are sufficiently spaced to mesh with the grass rather than compres it. The pod therefore cooperates with the grass to provide a stable foundation. In applications where the supporting surface is penetrable, spikes or sharp barbs may be used to anchor the stand. Other suitable pod configurations will be obvious to someone skilled in the art.

As mentioned above, the members 7 are biased in a retracted position. Thus, unless acted upon by another force, i.e., the actuator, the members remain in the retracted position. The members 4 are biased in the embodiment of FIG. 2 by a small spring 5 at the pivot mounting of each member to the sleeve. It should be understood, however, that various means for biasing the members exist. For example, different resilient means such as springs or rubber bands may be connected between the distal end and the sleeve, or a common resilient means may be configured to return the members to the retracted position, or the members themselves may have elastic properties. Aside from resilient means, a weight differential between the proximate and distal ends may be employed such that the proximate end 21 exerts a greater downward force across the pivot fulcrum than the distal end 22 such the members 4 tend to the retracted position.

The actuator 2 is an important component in the present invention since it actuates the members 4 into the deployed position. Again, like the sleeve 7, the actuator 2 may assume a variety of different shapes, as long as it slides within the sleeve 7 to actuate the members 4. Consequently, the horizontal cross-sections of the sleeve and the actuator will be substantially similar. As shown in FIGS. 1-4, the actuator 2 used in a stand for golf bags has a substantially circular cross section as does the sleeve 7. The actuator is substantially disc shaped and has notches 25 for accommodating the proximate end 21 of each member 4 when the actuator and the members are in the downward and retracted positions respectively.

In the preferred embodiments, the side of the actuator is inwardly tapered from the contacting surface 29 toward either the top 26, the bottom 27, or both. FIGS. 2 and 4 show the side 28 inwardly tapering toward the top 29 and bottom 27, leaving only the contacting surface 29 of the side 28 substantially axial to the sleeve 7. These tapers facilitate axial alignment and sliding between the actuator 2 and the sleeve 7. The top taper 43 provides for some play between the leading edge (top 26) of the actuator and the sleeve 7 while maintaining a close tolerance between the contacting surface 29 and the sleeve 7 where a tight fit is important. The benefit of such a configuration is that if the actuator 2 cocks slightly as it slides within the sleeve 7, no sharp corner will impact the inner side of the sleeve 7 and bind the actuator 2. Additionally, the top taper imparts a self correcting aspect to the actuator, enabling it to act like a wedge by infiltrating a narrow opening with little force. Finally, the elimination of sharp corners reduces the tendency of the actuator 2 to become entangled in the sleeve. The lower taper 44 also facilitates sliding too, but does so in a different way. When the stand 10 is placed upon an uneven supporting surface, as is often the case along a golf fairway for example, the edge of actuator's bottom will typically meet the supporting surface first. Such an impact will add a lateral force component to the actuator and may cause it to bind in the sleeve. To avoid this problem, a lower taper is used to move the initial contact point of the actuator inward, thereby reducing the lateral force component.

It is anticipated that the actuator—and the entire stand for the matter—will incorporate light, high strength designs and materials that are well known in the art. For example, in FIGS. 1-4, the actuator 2 is hollow to reduce weight and costs. Although the use of such light weight designs and materials is desired, it is also recognized that at some point the weight of the actuator may become insufficient to overcome the frictional forces involved in returning to the downward position. For this reason, the use of resilient means for biasing the actuator in the downward position may be used. The resilient means may be a traditional spring or a piece of foam rubber inserted between the shelf 20 and the actuator 2 (see FIG. 2).

Figure 6:
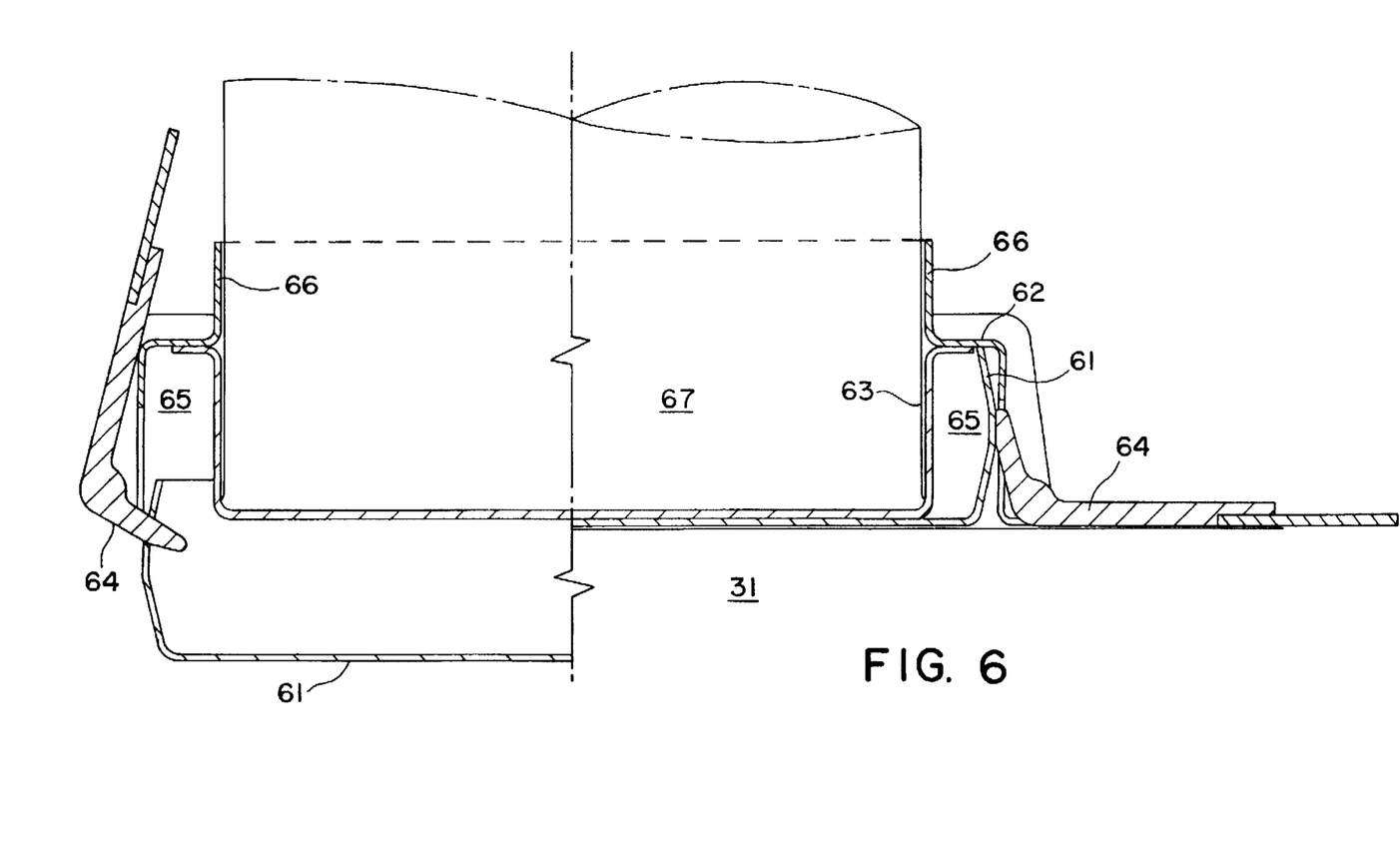
FIG. 6 shows another embodiment of the stand in which the actuator slides past a shelf holding the object.

The stand embodiment shown in FIG. 6 is designed to fit around the object rather than under it. The left side of the figure shows the stand with the actuator in the downward position, while the right side shows the stand upon the supporting surface with the supporting members deployed. As mentioned above, this embodiment provides vertical stability without significantly adding to the height of the object. This embodiment differs from the one described in FIGS. 1-4 by having a well 67 in shelf 63 and an opening in the top of the actuator 61 for receiving the well 67. The well 67 forms a channel 65 between it and the sleeve 62. The actuator 61 moves within this channel 65 to cooperate with the supporting members 64 in the same way as described above. Although the channel 65 is annular in this case, it should be obvious that any shape is possible.

Figure 7A:
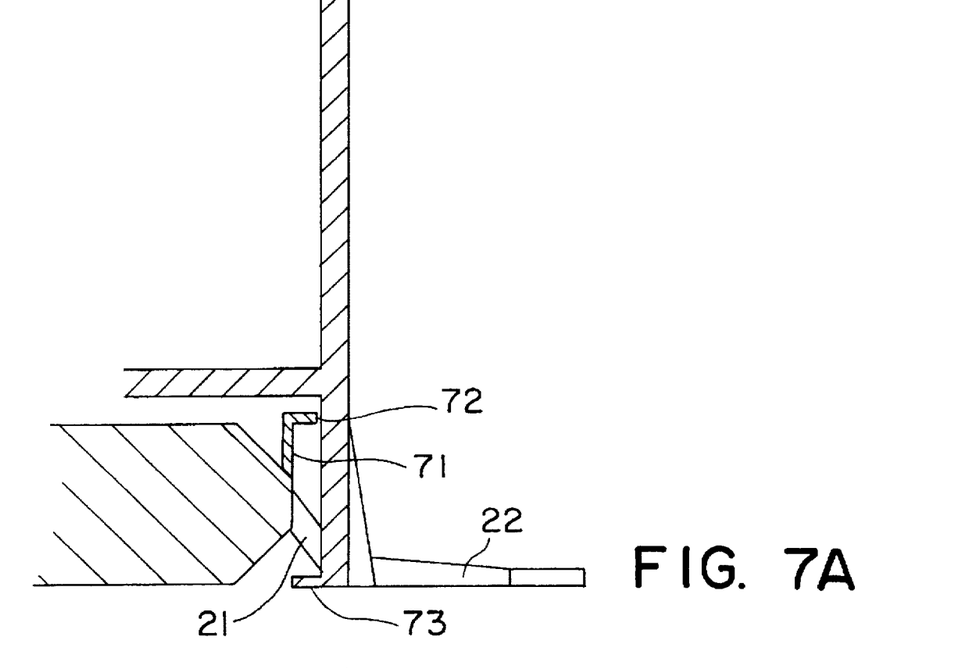
FIG. 7a shows an alternate embodiment of the connecting means in which a rigid skirt is used.
Figure 7B:
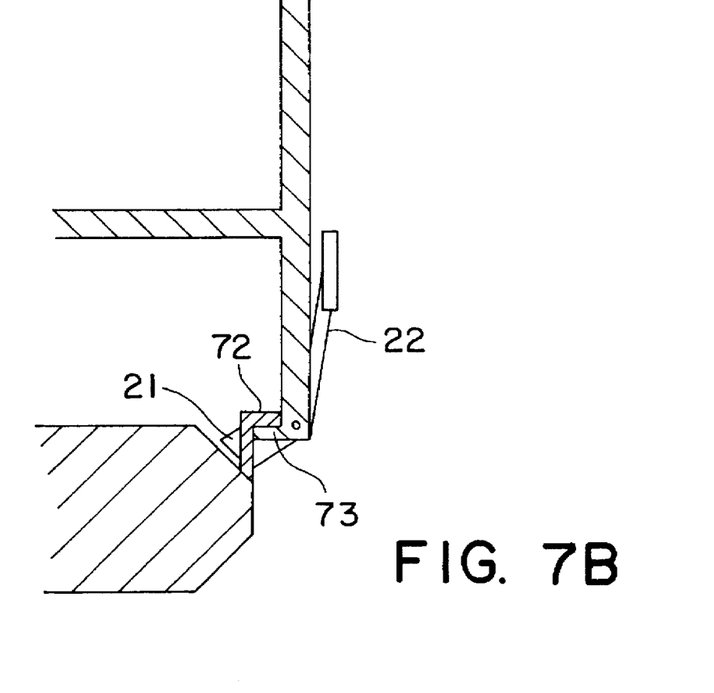
FIG. 7b shows the same embodiment with the actuator in the downward position.

The actuator 2 is secured to the sleeve using connecting means 3 as shown in FIGS. 1-4. Many variations of suitable connecting means 3 exist. In the preferred embodiment, the connecting means 3 comprises a flexible skirt adhered to the sleeve 7 and the actuator 2. It imparts enough lateral stability to maintain the actuator's alignment with the sleeve 7 when it is in the downward position. Part of the lateral stability arises because in this specific embodiment the flexible skirt has a certain length to hold the actuator such that in its downward position (FIG. 2), the top 26 remains within the interior of the sleeve 7. This provides a good starting point for the actuator to begin its upward slide relative to the sleeve. The flexible skirt not only maintains the actuator's alignment, but also prevents contaminants from entering the interior region 8 of the sleeve 7. Additionally, in the embodiment where the notches 25 are radially disposed about the actuator, the connecting means provides radial alignment such that the notches 25 receive the proximate ends of the support members when they are in the retracted position. When the stand is set upon a supporting surface 31 and the actuator moves up to deploy the members 4, the flexible skirt bellows outwardly as shown in FIGS. 3a, 3b, and 4. Another suitable embodiment of the connecting means involves a rigid skirt that is secured to the actuator and slides with it along the sleeve as shown in FIG. 7. The skirt may be configured to slide on the inner or the outer surface of the sleeve 7 along channels, grooves, or similar guidance means such that the actuator's radial alignment with the supporting members is maintained. The embodiment of FIG. 7 shows a rigid skirt 71 on the interior of the sleeve. This embodiment has a series of radially disposed notches corresponding to the location of the members such that the skirt slides past them without interference. Although restricting the axial downward movement was inherent in the flexible skirt, some kind of stop means is required in the rigid skirt embodiment to prevent the actuator from falling out of the sleeve when the stand is lifted off the supporting surface. Again, a stop means may assume a variety of different embodiments, but a preferred embodiment is shown in FIG. 7 wherein the stop comprises turning the lower edge 73 of the sleeve inwardly, and the upper edge of the rigid skirt 72 outwardly such that when the actuator is in the downward position, the two turned edges will meet and therefore prevent further movement as depicted in FIG. 7b.

Functionally, the members remain in a retracted position and the actuator remains in its downward position until the stand is placed upon the supporting surface. Then, the bottom of the actuator meets the surface, and gravity continues to draw the sleeve and its contents down over the actuator. This causes the actuator to slide axially vis a vis the sleeve. As the actuator slides within the sleeve, the contacting surface of the actuator impacts the proximate end of the members causing them to pivot radially and outwardly. The further down the sleeve slides, the more the members pivot.

A full pivot is achieved when the sleeve contacts the supporting surface, thus ending its axial slide over the actuator. At this point, as shown in FIG. 4, a portion 23 of each distal end 22 contacts the supporting surface 31 to impart vertical stability to the stand, while a portion 41 of each proximate end 21 contacts the contacting surface 29. The contacting surface 29 of the actuator therefore acts as a backstop for the members, preventing them from pivoting back into the retracted position. Additionally, since all the pivoting members simultaneously contact the actuator without any significance clearance, any force in one direct causes a reaction at all other contact points thereby locking the actuator in place. The members will remain in a deployed position until the actuator is removed as a backdrop; that is, until it returns to the downward position. The actuator returns to the downward position by allowing gravity to act upon it when the stand is lifted from the supporting surface. Without the supporting surface contacting the bottom of the actuator, the actuator drops relative to the sleeve. This eliminates the contact between the contacting surface and the proximate ends thereby enabling the members to return to their biased, retracted positions.

Figure 8:
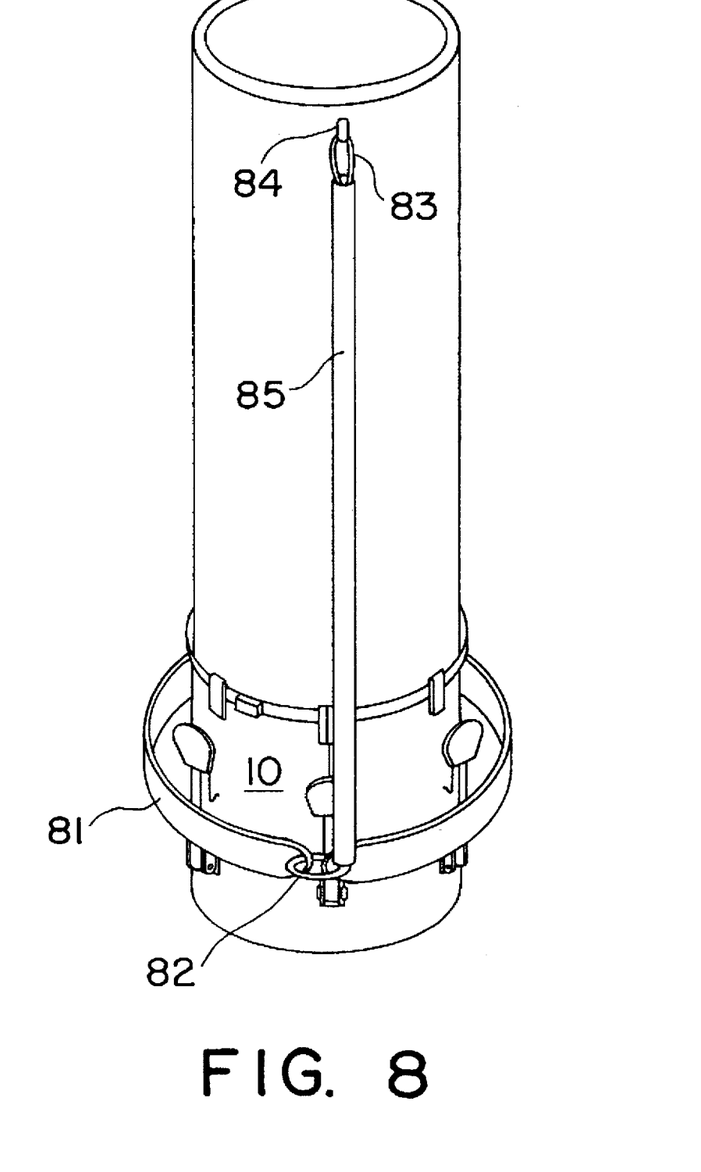
FIG. 8 shows an embodiment of the restraining means.

There may be occasions where the user does not want the supporting member to deploy. For example, when golfing, the user may encounter terrain which is unsuited for the portable stand (e.g., rocky, uneven surfaces) or he may place the bag/stand assembly in a holder that interferes with the deployed supporting members. In such cases, restraining means may be required. Restraining means may be any mechanism that maintains the supporting members in the retracted position. FIG. 8 shows one embodiment of the restraining means having an elastic cord 82, a loop 81 connected to one end the elastic cord 82, a top hook 83 connected to the other end of the elastic cord 82, and an anchor 84 permanently secured to the bag. The elastic cord 82 connects to the loop 81 such that, under tension, it tends to restrict the loop 81. In this way, when the loop 81 is in a relaxed state, the user can slip it under the stand and pull it around the retracted supporting members. The user then pulls on the elastic cord 82 and fastens the hook 83 to the anchor 84. By pulling on the cord and securing it to the bag, tension is maintained in the cord which in turn contracts the loop 81. The contracted loop 81 thereby prevents the supporting members from deploying. For convenience, a rigid sheathing 85 may be used to aid the user in looting the loop 81 around the stand.

Obviously, numerous modifications and variations of the present invention are possible in the light of the above teachings. It is therefore understood that within the scope of the appended claims, the invention may be practiced otherwise than as specifically described herein.

What is claimed is:

1. A portable stand for vertically stabilizing an object upon a supporting surface, said stand comprising:
   a sleeve having a vertical axis and defining an interior region adapted to receive said object;
   a plurality of supporting members radially disposed about said sleeve, each supporting member having a proximate and a distal end, each supporting member being pivotly and axially mounted to said sleeve, said supporting members being biased toward a retracted position, in said retracted position, said proximate end of each supporting member radially and inwardly extends in said interior of said sleeve, said supporting members tending toward said retracted position when said stand is not on said supporting surface;
   an actuator having a contacting surface, said actuator adapted to slide axially within said sleeve, said actuator biased in a downward position by gravity such that said contacting surface is positioned below each proximate end when said stand is not on said supporting surface, when said stand is placed upon said supporting surface, said actuator meets said supporting surface and said sleeve slides over said actuator such that said contacting surface directly contacts each proximate end causing each supporting member to pivot toward a deployed position, in said deployed position, said proximate end contacts said contacting surface and said distal end radially and outwardly extends for contact with said supporting surface; and
   connection means for connecting said actuator to said sleeve such that said actuator remains axially aligned with said sleeve.

2. The stand of claim 1, wherein said portion of said distal end that contacts said supporting surface and said portion of said proximate end that contacts said contacting surface are at an angle of at least about ninety degrees relative to each other.

3. The stand of claim 2, wherein said distal end has a pod for contacting said supporting surface.

4. The stand of claim 3, wherein said pod has plastic tufts for interfacing with grassy surfaces.

5. The stand of claim 2, wherein said proximate end of said supporting member comprises a flat portion for butting against said contacting surface of said actuator when said member is in said deployed position.

6. The Stand of claim 2, wherein each member is biased by a spring.

7. The Stand of claim 2, further comprising:
   a shelf connected to said sleeve, said shelf being substantially horizontal and disposed within said interior region.

8. The Stand of claim 2, further comprising
   a shelf connected to said sleeve, said shelf having a receiving well for receiving said object, thereby defining a channel between said well and said sleeve; and
   wherein said actuator slides axially within said channel and has an open top for receiving said well.

9. The Stand of claim 2, wherein said connection means comprises a flexible skirt secured to said sleeve and said actuator.

10. The Stand of claim 2, wherein said actuator tapers inwardly from said contacting surface upward.

11. The Stand of claim 2, wherein said actuator tapers inwardly from said contacting surface downward.

12. The Stand of claim 2, wherein said actuator tapers inwardly from said contacting surface upward, and wherein said actuator tapers inwardly from said contacting surface downward.

13. The Stand of claim 2, wherein said actuator comprises radially disposed notches for receiving said proximate end of each supporting member when said actuator is in said downward position.

14. The stand of claim 2, further comprising attaching means for securing the stand to said object.

15. The stand of claim 14, wherein said attaching means comprises a strap mounted to said sleeve, said strap being adjustable to connect said sleeve to said object.

16. The stand of claim 2, further comprising:
   restraining means for maintaining said supporting members in said retracted position.

17. A portable stand for vertically stabilizing an object upon a surface, said stand comprising:
   a sleeve having a vertical axis and defining an interior region adapted to receive said object;

a shelf connected to said sleeve, said shelf having a receiving well substantially in its center for receiving said object, thereby defining a channel between said well and said sleeve;

a plurality of supporting members radially disposed about said sleeve, each supporting member being angled and having a proximate and a distal end, each supporting member being pivotly and axially mounted to said sleeve, said supporting members being biased toward a retracted position, in said retracted position, said proximate end of each supporting member radially and inwardly extends in said interior of said sleeve, said supporting members tending toward said retracted position when said stand is not on said supporting surface;

an actuator, said actuator adapted to slide axially within said channel and having a contacting surface and an open top for receiving said well, said actuator biased in a downward position by gravity such that said contacting surface is below each radially and inwardly extending proximate end when said stand is not on said supporting surface, when said stand is placed upon said supporting surface, said actuator meets said supporting surface and said sleeve over said actuator such that said contacting surface directly contacts each proximate end causing each supporting member to pivot toward a deployed position, in said deployed position, said proximate end contacts said contacting surface and said distal end radially and outwardly extends for contact with said supporting surface; and connection means for connecting said actuator to said sleeve such that said actuator remains axially aligned with said sleeve.

18. A portable stand for vertically stabilizing an object upon a supporting surface, said stand comprising:

a sleeve having a vertical axis and defining an interior region adapted to receive said object;

a plurality of supporting members radially disposed about said sleeve, each supporting member having a proximate and a distal end, each supporting member being pivotly and axially mounted to said sleeve, said supporting members being biased toward a retracted position, in said retracted position, said proximate end of each supporting member radially and inwardly extends in said interior of said sleeve, said supporting members tending toward said retracted position when said stand is not on said supporting surface;

an actuator having a contacting surface, said actuator adapted to slide axially within said sleeve, said actuator biased in a downward position by gravity such that said contacting surface is positioned below each proximate end when said stand is not on said supporting surface, when said stand is placed upon said supporting surface, said actuator meets said supporting surface and said sleeve slides over said actuator such that said contacting surface directly contacts each proximate end causing each supporting member to pivot toward a deployed position, in said deployed position, said proximate end contacts said contacting surface and said distal end radially and outwardly extends for contact with said supporting surface wherein said portion of said distal end that contacts said supporting surface and said portion of said proximate end that contacts said contacting surface are at an angle of at least about ninety degrees relative to each other; and connection means for connecting said actuator to said sleeve such that said actuator remains axially aligned with said sleeve, wherein said connection means comprises a flexible skirt secured to said sleeve and said actuator.

19. A portable stand for vertically stabilizing an object upon a supporting surface, said stand comprising:

a sleeve having a vertical axis and defining an interior region adapted to receive said object;

a plurality of supporting members radially disposed about said sleeve, each supporting member having a proximate and a distal end, each supporting member being pivotly and axially mounted to said sleeve, said supporting members being biased toward a retracted position, in said retracted position, said proximate end of each supporting member radially and inwardly extends in said interior of said sleeve, said supporting members tending toward said retracted position when said stand is not on said supporting surface;

an actuator having a contacting surface, said actuator adapted to slide axially within said sleeve, said actuator biased in a downward position by gravity such that said contacting surface is positioned below each proximate end when said stand is not on said supporting surface, when said stand is placed upon said supporting surface, said actuator meets said supporting surface and said sleeve slides over said actuator such that said contacting surface directly contacts each proximate end causing each supporting member to pivot toward a deployed position, in said deployed position, said proximate end contacts said contacting surface and said distal end radially and outwardly extends for contact with said supporting surface, and wherein said actuator comprises radially disposed notches for receiving said proximate end of each supporting member when said actuator is in said downward position, wherein said portion of said distal end that contacts said supporting surface and said portion of said proximate end that contacts said contacting surface are at an angle of at least about ninety degrees relative to each other; and connection means for connecting said actuator to said sleeve such that said actuator remains axially aligned with said sleeve.

20. The Stand of claim 19, wherein said connection means comprises a flexible skirt secured to said sleeve and said actuator.

21. The stand of claim 19, wherein each support member is biased by a spring near its pivot point.

22. A portable stand for vertically stabilizing an object upon a supporting surface, said stand comprising:

a sleeve having a vertical axis and defining an interior region adapted to receive said object;

a plurality of supporting members radially disposed about said sleeve, each supporting member having a proximate and a distal end, each supporting member being pivotly and axially mounted to said sleeve, said supporting members being biased toward a retracted position, in said retracted position, said proximate end of each supporting member radially and inwardly extends in said interior of said sleeve, said supporting members tending toward said retracted position when said stand is not on said supporting surface, an actuator having a contacting surface, said actuator adapted to slide axially within said sleeve, said actuator biased in a downward position by gravity such that said contacting surface is positioned below each proximate end when said stand is not on said supporting surface, when said stand is placed upon said supporting surface, said actuator meets said supporting surface and said sleeve slides over said actuator such that said contacting surface directly contacts each proximate end causing each supporting member to pivot toward a deployed position, in said deployed position, said proximate end contacts said contacting surface and said distal end radially and outwardly extends for contact with said supporting surface, wherein said portion of said distal end that contacts said supporting surface and said portion of said proximate end that contacts said con tacting surface are at an angle of at least about ninety degrees relative to each other;

connection means for connecting said actuator to said sleeve such that said actuator remains axially aligned with said sleeve; and attaching means for securing the stand to said object, wherein said attaching means comprises a strap mounted to said sleeve, said strap being adjustable to connect said sleeve to said object.

* * * * *